Oct. 19, 1954 — J. RABINOW — 2,692,035
SELF-ADJUSTING CLUTCH OR BRAKE
Filed Dec. 20, 1949 — 4 Sheets-Sheet 2

INVENTOR.
JACOB RABINOW
BY James and Franklin
ATTORNEYS

Oct. 19, 1954   J. RABINOW   2,692,035
SELF-ADJUSTING CLUTCH OR BRAKE
Filed Dec. 20, 1949   4 Sheets-Sheet 4 fig. 13.
fig. 14.

INVENTOR.
JACOB RABINOW
BY
James and Franklin
ATTORNEYS

Patented Oct. 19, 1954

2,692,035

UNITED STATES PATENT OFFICE 2,692,035

SELF-ADJUSTING CLUTCH OR BRAKE

Jacob Rabinow, Takoma Park, Md.

Application December 20, 1949, Serial No. 133,999

16 Claims. (Cl. 192—111)

This invention relates to friction clutches and brakes, and more particularly to means for keeping the same in adjustment to compensate for wear.

Clutches and brakes as now constructed must be taken out of operation and serviced when it is necessary to adjust the same to make up for wear of the friction surfaces or shoes. This is expensive and troublesome. In order to avoid the need for frequent adjustment, the throw or relative movement of the main parts of the clutch or brake is sometimes made substantial. This is undesirable for mechanical reasons, and slows the operation or response of the clutch or brake. A large throw is particularly undesirable when the clutch is of the magnetic type, for a greatly increased magnetic excitation is required when a substantial spacing or throw is provided. In prior magnetic clutches two methods have been employed to allow for wear of the clutch facings. One is to use a very large magnetic gap so that wear does not make an appreciable difference in the gap length. The other is to let the magnetic surfaces touch each other and to let the iron wear with the friction surfaces. In the first approach, the reluctance changes with wear, which is highly undesirable since the same excitation results in different amounts of pull (and torque). In the second method, relining is difficult, and steel is very poor friction material when used against steel.

The primary object of the present invention is to generally improve clutches and brakes. A more particular object is to overcome the foregoing difficulties by providing self-adjusting means to automatically compensate for excessive wear. A still more specific object is to provide different forms of clutch or brake for varied purposes and requirements.

In my clutch the gap is kept near the zero, resulting in very migh magnetic efficiency.

Self-adjusting clutches and particularly brakes are well known to the art. But, as far as I have been able to discover all of the previous techniques have this in common: the adjustment occurs when the operating "throw" exceeds a predetermined value. That is, for the adjustment to take effect, the clutch or brake must be released and re-engaged. In no previous device of this type has automatic adjustment been provided if the machine remained continuously in the energized condition. My invention provides automatic adjustment independently of whether the clutch is periodically released and engaged or whether it remains engaged permanently at full or modulated torque.

An important advantage is the small throw for the clutch, and when the clutch is adjusted no increase in throw is needed. The wear is compensated continuously instead of in large steps, and the pressure at the friction shoe is kept constant. The adjustment is independent of pressure, and any clutch designed for variable pressure may be adjusted for desired pressure wholly independently of the taking up of physical wear.

To accomplish the foregoing general objects, and other more particular objects which will hereinafter appear, my invention resides in the self-adjusting clutch or brake elements, and their relation one to another, as are hereinafter more particularly described in the following specification. The specification is accompanied by drawings in which.

Figures 9, 9A:
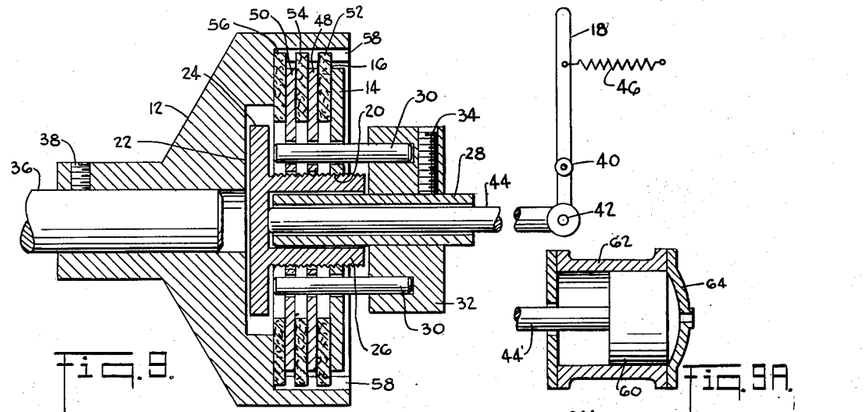
Fig. 9 is a section through a mechanically operated multiple disc clutch.
Fig. 9A is a fragmentary view explanatory of a modification providing for hydraulic or pneumatic operation.

Referring to the drawing, and more particularly to Fig. 9, the clutch assembly there shown comprises a main driving part 12, a main driven part 14, said parts having friction surfaces at 16, a control means 18 for engaging or disengaging the friction surfaces, an adjustment means at 20 to adjust the disengaged spacing at 16, and an adjustment operating auxiliary for operating the adjustment means 20. The auxiliary is itself a clutch having two relatively movable parts, one indicated at 22 and the other at 24. The part 24 is movable with the main clutch part 14 toward and away from the other clutch part 22. The parts 22 and 24 of the auxiliary are normally spaced from one another, but are moved closer together as the main friction surfaces wear, until finally the auxiliary clutch parts 22 and 24 engage before the main friction surfaces engage, and thereby cause the auxiliary to operate the adjustment means 20 in order to bring the main friction surfaces toward one another and thereby compensate for their wear.

In the present case the adjustment means consists of a thread on hub 26 of the auxiliary part 24, and a mating thread on plate 14. The direction of the thread is so related to the direction of rotation as to move the plate 14 toward the left as viewed in the drawing. The plate 14 is appropriately slidably carried on the shaft 28. In the present case this is done by means of a suitable number, say four, pins 30 secured in a part 32 which is locked to shaft 28, as by means of set screws 34, one of which is shown at 34. The clutch part 12 is arranged to receive a shaft 36 and may be secured thereto by means of set screws, one of which is shown at 38. Either shaft 36 or 28 may be the input shaft, the other then being the output shaft.

The external control means is shown schematically, it comprising a lever 18 pivoted at 40 and connected at 42 to a pushrod 44 passing through hollow shaft 28 and bearing at its inner end against the center of auxiliary part 24. While not shown, it will be understood that a suitable thrust bearing may be disposed therebetween. It will be evident that by moving lever 18 toward the right the pushrod 44 will be moved toward the left, thereby moving the auxiliary part 24 with its hub 26 and the main clutch plate 14, thus engaging the clutch and connecting the shafts 28 and 46. By moving the lever 18 toward the left the clutch pressure is relieved and the clutch disengaged. In some cases the lever may be normally moved in one direction or the other by suitable spring means, here suggested by a spring 46 which causes the clutch to be normally engaged. By connecting the spring in the opposite direction the clutch will be normally disengaged. By connecting a spring to bias the lever in either direction, with the lever unstable in mid-position, the clutch will remain either engaged or disengaged whenever the lever is moved manually toward one side or the other of dead center.

As so far described the clutch might be a single plate clutch, but that here shown is a multiple plate clutch, the pins 30 carrying not only the plate 14, but also additional intermediate plates 48 and 50, while the main clutch part 12 carries not only the friction ring 52, but also additional friction rings 54 and 56. It will be understood that the rings 52, 54 and 56 are splined to the clutch part 12, as is indicated at 58. This may follow conventional practice and need not be described in detail, the purpose being to make the multiple plates of the clutch freely movable axially for engagement or disengagement, but non-rotatable relative to the main clutch part.

In summary, it will be seen that the complete clutch assembly of Fig. 9 comprises a first clutch including relatively movable parts 12 and 24, a second clutch having relatively movable parts 22 and 24, and an external control means 18 for controlling the engagement or disengagement of one of the clutches, in this case the first clutch 12, 14. The second clutch 22, 24 is normally disengaged, but its parts move toward one another as the friction surfaces of the first clutch wear, until finally the second clutch 22, 24 engages before the first clutch, whereupon the second clutch acts as an adjustment operating means and drives the adjusting mechanism, in this case the threaded hub 26 within the threaded disc 14, in such a direction as to compensate for the wear of the friction surfaces of the first clutch.

It will be understood that the manually operable lever 18 shown at Fig. 9 may be replaced by a pedal operated lever, or by hydraulic or pneumatic booster means. This is schematically illustrated in Fig. 9A in which the rod 44' corresponds to the rod 44 in Fig. 9, the said rod being connected to a piston 60 within a cylinder 62. A suitable source of fluid under pressure, either hydraulic or pneumatic, may be connected through any appropriate or conventional valve means to the head 64 of cylinder 62, thereby controlling the operation of the pushrod 44'.

Although the present invention is applicable to a clutch controlled by any of the aforesaid external means, it has particular advantage with a so-called "magnetic clutch," that is, a clutch in which the engagement or disengagement is controlled by magnetic means. The reason for this will become evident in the following description, for the magnetic means may itself be used as one of the two clutches making up the complete clutch assembly.

Figures 1, 2, 7:
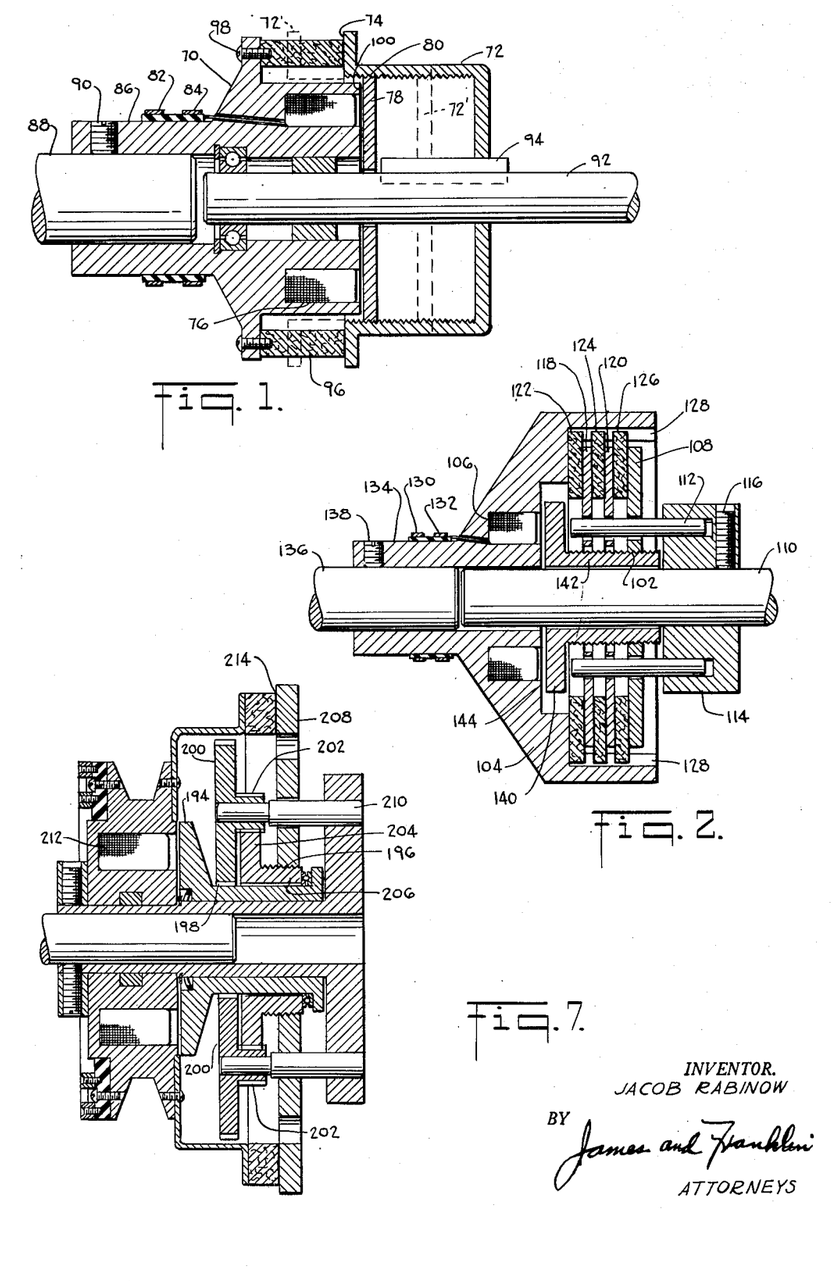
Fig. 1 is a longitudinal section through an electro-magnetic clutch embodying features of my invention.
Fig. 2 is a similar section through a multiple plate clutch.
Fig. 7 is a section through a clutch embodying gear reduction means to facilitate adjustment and to prevent over-compensation.

Referring now to Fig. 1 of the drawing, the main clutch consists of relatively movable parts 70 and 72 which come into frictional engagement at 74. The control means for causing engagement or disengagement of the main clutch includes a magnet, in this case an electro-magnet coil 76 in a ferrous body 70, the resulting magnet operating on a ferrous armature 78 connected to the main clutch part 72 through adjusting means, here shown as a thread 80. Leads from coil 76 are brought out to appropriate slip rings 82 and 84 on the hub 86 of the main clutch part 70, said hub being adapted to receive a shaft here indicated at 88, and secured thereto by suitable means such as one or more set screws 90. The clutch part 72 is slidably keyed to another shaft 92, as by means of a key 94. The wearable friction surface or lining is here indicated by a cylindrical shoe 96 secured at 98 to the main clutch part 70.

It will be understood that the clutch is disengaged whenever the magnet coil 76 is de-energized, and that the clutch is engaged whenever the magnet coil is energized, this being done through an external control circuit and suitable brushes, not shown, bearing against the slip rings 82, 84. Either the shaft 88 or the shaft 92 may be the driving shaft, the other being the driven shaft. The normal clutch operation proceeds until the friction shoe 96 wears to such an extent that when the magnet coil 76 is energized the armature disc 78 reaches the pole face 100 before the main clutch surfaces engage, whereupon the armature plate 78 revolves with the main clutch part 70 and is screwed backward on the thread 80 until the main clutch surfaces at 74 come into driving engagement. This description assumes that shaft 88 is the driving shaft. If shaft 88 is the driven shaft the only difference is that armature plate 78 remains stationary with clutch part 70, while driven part 72 revolves with shaft 92, but with the same end result, that is, the direction of the thread is always so related to the direction of rotation of the shafts as to move the adjustable part of the clutch in that direction which compensates for wear.

The described clutch may be designed for extreme wear and long life. This is suggested by the dotted line position 72' for the clutch part 72, showing the large distance over which wear may be taken up. It is important to observe that throughout the operation of the clutch the actual throw of the clutch to disengage the same may be kept constant and at a minimum. The necessary movement may be almost imperceptible, yet wear may be taken up over a long distance, as shown in the drawing. This again is of especial advantage with a magnetic clutch, for the magnetic clutch works best when the gap between the armature 78 and the magnet face 100 may be kept small. In conventional clutch design there is a tendency to increase the throw of the clutch in order to decrease the frequency with which the operation of the machine must be interrupted for servicing or adjustment of the clutch to make up for wear. This is not at all necessary with the present improved clutch, and the throw may be made as little as desired for best clutch operation, the wear being automatically taken up almost continuously in minute increments as soon as wear takes place.

The application of the invention to a multiple disc clutch, is shown in Fig. 2. This modification differs from Fig. 1 also in making the adjusting thread 102 of relatively small diameter instead of large diameter, as shown in Fig. 1. In general the diameter of the adjusting thread should preferably be as small as possible compared to the main diameter of the friction faces of the clutch. The main clutch part 104 is preferably made of iron and carries a magnetizing coil 106. The other main clutch plate 108 is connected to shaft 110 through pins 112 fixed in a member 114 locked on shaft 110 by means of a set screw 116. (In all illustrations multiple set screws or keys, etc. may be employed.) The pins 112 carry additional clutch plates 118 and 120. The clutch part 104 carries friction rings 122, 124 and 126 all splined to clutch part 104, as indicated at 128.

Magnet coil 106 is energized through brushes and external connections, not shown, to appropriate slip rings 130 and 132. These are disposed on hub 134 secured to a shaft 136 by means of set screw 138. The coil when energized attracts an armature 140 having a hub 142 externally threaded, as indicated at 102, to mate with a thread in main clutch plate 108.

In operation either the shaft 136 or the shaft 110 may be the driven shaft, but for the moment it will be assumed that shaft 136 is the driving shaft. The clutch is disengaged whenever the coil 106 is de-energized. When the coil is energized the armature 140 is pulled to the left, thereby moving the main clutch plate 108 to the left and so causing frictional engagement of the multiple plate clutch. This operation continues until the friction surfaces become worn so far that armature 140 reaches the pole face 144 before the friction clutch faces engage, whereupon armature 140 rotates with the driving part 104 of the clutch, while driven clutch plate 108 remains stationary, thus causing plate 108 to be drawn to the left by the action of the adjusting thread until the frictional surfaces of the clutch take hold, whereupon the entire clutch assembly again turns bodily as a unit.

It will be evident that the multiple plate clutch shown in Fig. 2 resembles that shown in Fig. 9, except that the control means is magnetic instead of mechanical, and further that the magnetic control means itself acts as the second or auxiliary clutch for operating the adjusting means. From an opposite viewpoint it might be said that the second or auxiliary clutch is a magnetic clutch which acts also as the control means for the first or multiple disc clutch.

Still another form of the invention is illustrated in Figs. 3 through 6 of the drawing. In this case the clutch structure is combined with a pulley; the slip rings are disposed on one end face of the structure to conserve axial dimension; and the adjustment mechanism is provided with means to prevent false adjustment or overcompensation, due to sudden starts and stops. Referring to the drawing, there is a main clutch part 150 and another main clutch part 152 coming into frictional engagement at 154, the friction shoe 156 being carried by the clutch part 150. Either the pulley 158 or the shaft 160 may act as the input or driving end of the clutch. For the present it will be assumed that the pulley is the driving portion of the clutch. It is made of ferrous material and carries magnetizing coil 162. Clutch plate 152 is axially movable on a plurality, in this case three pins 164, carried by a member 166 formed integrally with a long sleeve 168. The sleeve may be flanged at its opposite end, as by means of a collar 170 held in place by one or more set screws 172. The sleeve is secured to shaft 160, as by means of one or more set screws 174.

Figure 3:
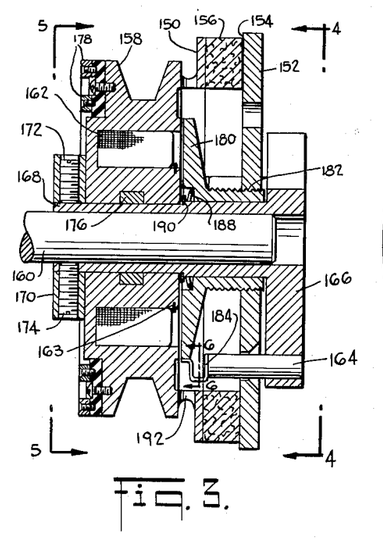
Fig. 3 is a section through a clutch combined with a pulley.
Figure 4:
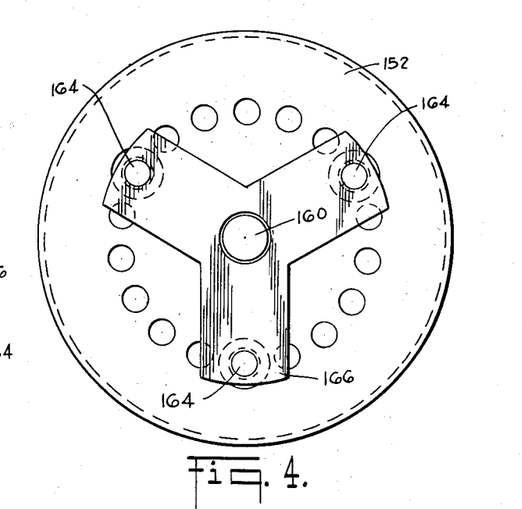
Fig. 4 is an end elevation of the same looking in the direction of the arrows 4—4 of Fig. 3.

The ferrous body of the pulley is freely rotatable on the outside of sleeve 168, and may be lubricated as by means of an annular groove and wick 176. The coil 162 is connected to slip rings 178, and it will be evident that when an external power supply is fed to the coil, the armature 180 is pulled to the left, thereby pulling the clutch plate 152 against the friction shoe 156. The operation is the same as previously described, the device acting as a magnetic clutch until the friction shoe 156 is worn far enough for the armature 180 to come against the pole face of coil 162, whereupon the armature is momentarily locked to the pulley and is turned thereby, thus screwing the hub of the armature further through the clutch plate 152, or, in other words, moving the plate toward the left to compensate for the clutch wear.

Figures 5, 6, 8:
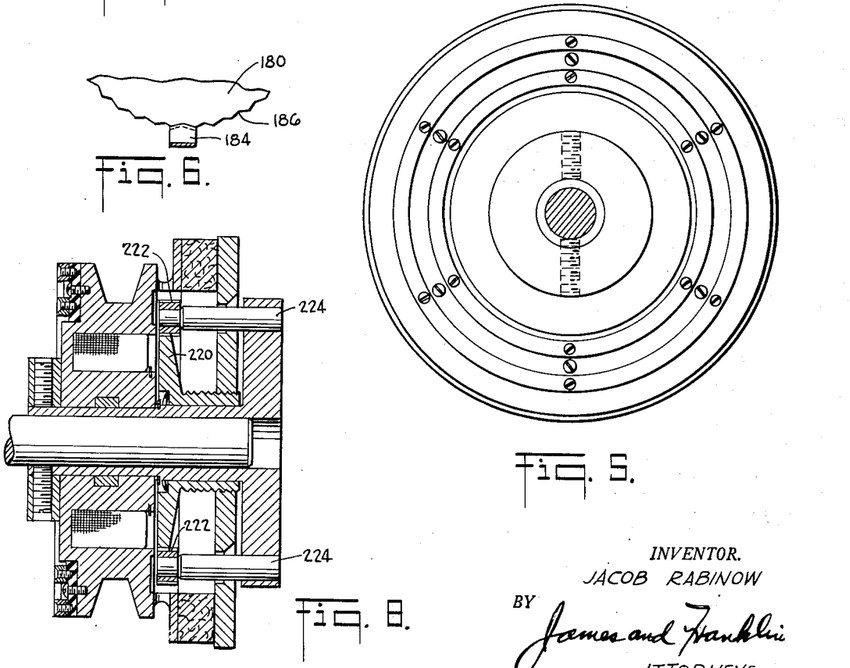
Fig. 5 is an end elevation of the same looking in the direction of the arrows 5—5 of Fig. 3.
Fig. 6 is a fragmentary section taken approximately in the plane of the line 6—6 of Fig. 3 showing detent means to prevent overcompensation.
Fig. 8 is a section through a clutch embodying inertia means to prevent overcompensation.

To prevent spin or overcompensation I provide a detent spring 184, the end of which bears against a continuous series of shallow detent notches formed around the periphery of the armature 180. This is best shown in Fig. 6, in which it will be seen how detent spring 184 rides in detent notches 186. It will be evident that with this construction the rotation of the armature will not be carried too far by inertia, and instead will be inhibited or arrested the moment the main clutch surfaces take hold. The detent means prevent false adjustment caused by sudden stops and starts. Here again the complete assembly consists of a main clutch and magnetic control means for controlling the main clutch, the said control means acting also as an auxiliary clutch for operating the compensating or clutch-adjusting means.

The coil 162 may be held in position by means of a snap ring 163 which is sprung into a groove. The disengagement of the clutch may be aided by means of a spring washer 188 disposed between the armature 180 and a snap ring 190, the latter being sprung into a groove in the sleeve 168. The spring washer may be a corrugated spring washer. Ventilating holes 192 may be provided in the periphery of the main clutch part.

Fig. 7 shows a clutch generally similar to that shown in Fig. 3, but provided with a different mechanism to prevent overcompensation. In this case the rotation of the armature 194 drives the clutch-adjusting thread 196 through high-ratio reduction gearing. More specifically, the armature 194 has gear teeth formed at 198, the said teeth meshing with relatively large diameter planet gears 200, each of which turns a small diameter pinion 202. The pinions mesh with a sun gear 204, the hub 206 of which is threaded to mate with the thread on the main clutch plate 208. The planet gears may, if desired, be carried on the ends of the pins 210, which are anyway provided in suitable number as a part of the clutch shown in Fig. 3.

It will be evident that the operation of this clutch is the same as previously described, the armature 194 being pulled to the left by the action of the thrust bearing whenever the coil 212 is energized, thereby causing frictional engagement of the main clutch at the friction surfaces 214. However, as the clutch shoe wears away the armature moves a little further to the left, and finally, when the armature engages the pole face of coil 212 before the main clutch takes hold, the armature 194 is spun and turns the adjusting screw in such a direction as to move the main clutch plate 208 toward the left, thereby compensating for the wear. However, the rotation at the screw is quite slow compared to the rotation of the armature, and that fact, taken together with the counter-inertia and friction of the parts, inhibits or prevents false compensation due to starts and stops and prevents overcompensation, and results in a fine, gradual and accurate adjustment.

Still another method of preventing the false adjustment referred to above is illustrated in Fig. 8 of the drawing. The clutch there shown is generally similar to that previously described in connection with Figs. 3 and 7. In this case, however, gear teeth are formed at the periphery of the armature 220, the said teeth meshing with pinions 222 carried at the ends of the pins 224 forming a part of the regular clutch structure. The pinions 222 are idle pinions, but they have considerable inertia which can be made to neutralize the inertia of member 220 because the rotation is in a direction opposite to the direction of rotation of the member 220. I have found that with this construction the rotation of the armature 220 can be caused only by the proper action of friction and not by sudden starts and stops.

A fourth way to prevent overcompensation is by simply introducing friction in the adjustment. For example, the thread may be a snug thread, or there may be friction shoes pressing against one end of the threaded piece.

Several ways of eliminating slip rings in magnetic clutches are known. One is the subject of my co-pending patent application, Serial No. 119,247, filed October 3, 1949, which discloses self-excited clutches. These include the use of a stationary magnet that transfers its field through supplementary air gaps to the working magnet, and the use of transformer action to induce an A. C. current for the clutch, which current, if desired, may be rectified. Another way to eliminate slip rings is the use of permanent magnets with controllable air gaps, as disclosed in my co-pending patent application, Serial No. 783,426, filed October 31, 1947, now Patent No. 2,575,360.

Figures 10, 11A:
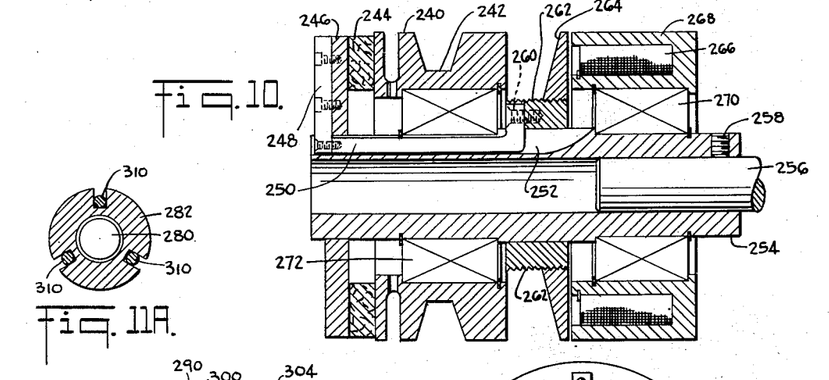
Fig. 10 is a section through a magnetic clutch of small diameter employing a stationary magnet.
Fig. 11A is a section in the plane of the line 11A—11A of Fig. 11.

In the clutches so far described the magnet coil rotates with the clutch. However, it is not essential to employ a rotating magnet, and a modification in which the magnet is stationary is shown in Fig. 10. One main clutch part is shown at 240, this carrying a pulley groove 242 formed integrally therein. An annular friction shoe 244 is secured to the clutch part 240. The other main clutch part is represented by a suitable steel disc 246 connected by means of one or more radial keys 248 to one or more axially directed keys 250 slidably received in one or more slots or keyways 252 formed in a long sleeve 254, the latter being secured to a shaft 256 by suitable means such as a plurality of set screws 258. There are preferably three keys and keyways. It is here assumed that the shaft 256 is driving.

The keys 250 are secured at 260 to a threaded bushing 262 which acts as the adjusting means for the clutch, the said bushing mating with a threaded armature 264. The latter cooperates with a magnet, in this case a coil 266 received in a stationary ferrous housing or pole structure 268. The magnet is arranged concentrically with the clutch, and may be supported by means of an anti-friction bearing 270, or, conversely, the housing 268 is fixedly held in a part of the machine frame and bearing 270 serves to support the sleeve 254 and shaft 256. The main clutch part 240 is rotatable outside the sleeve 254 by means of an anti-friction bearing 272. The bearings are held against axial movement by appropriate shoulders and cooperating snap rings which may be sprung into mating grooves, as will be clearly seen in the drawing.

The operation of the clutch will be understood on reflection, for whenever the magnet coil is energized the armature 264 is pulled to the right, thereby pulling the clutch plate 246 to the right through keys 250. When clutch plate 246 is pulled to the right the clutch is engaged, and consequently the assembly of the shaft 256, the sleeve 254, the keys 250, and the plate 246 all turn bodily as a unit and drive the main clutch part 240 with its pulley 242. At this time the armature 264 is spinning relative to the stationary coil 266, but that is of no consequence, for the magnetic axial attraction of the coil is exerted the same as though both were either stationary or rotating together. The magnetic field produces no torque if the structures cutting the flux are symmetrical about the rotating axis, for in that case there are no circulating currents (eddy currents), and no torque is produced.

As the annular friction shoe 244 wears, the armature moves slightly toward the right, until finally it comes into contact with the magnet pole face before the main clutch takes hold, whereupon the armature is held against rotation. The continued rotation of the shaft and sleeve 254 causes the threaded bushing 262 to be screwed toward the right, thus bringing the friction surfaces of the main clutch into holding engagement, and at the same time backing the armature away from the pole face, whereupon the armature again turns with the sleeve assembly. Viewed differently, the rotation of the shaft 256 and sleeve 254 causes the threaded bushing 262 to be rotated inside the stationary armature 264, and so works the armature away from the pole face or toward the left until it is again freed for rotation with the sleeve assembly, but at this time the air gap therebetween affords movement of the keys 250 and clutch plate 246 toward the right so that the main clutch again engages, the wear of the friction surface having been taken up or compensated.

Figure 11:
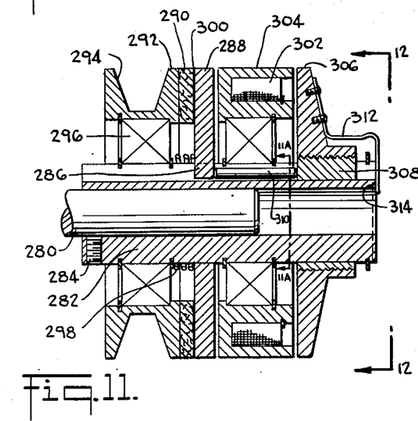
Fig. 11 is a section through a modification provided with means to prevent overcompensation.
Figure 12:
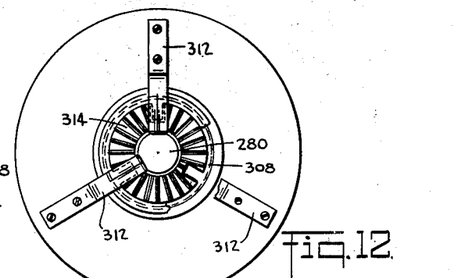
Fig. 12 is an end elevation looking in the direction of arrows 12—12 of Fig. 11.

A modified form of clutch employing a stationary magnet and also utilizing spring detent means to prevent overcompensation is shown in Figs. 11 and 11A, and 12. Referring thereto, shaft 280 is secured to a long sleeve 282 by means of set screws 284, the said sleeve having a plurality, say three, keyways receiving keys or splines 286 at the inner periphery of a steel clutch plate 288. The latter engages an annular friction shoe 290 secured to a clutch member 292 having a pulley 294 formed therein. The pulley is rotatable on sleeve 282 through an intermediate anti-friction bearing 296, the latter being held against axial movement by means of suitable snap rings sprung into grooves. A compression spring 298 serves to normally disengage the clutch at the working face 300.

A magnet coil 302 is housed in a stationary ferrous housing 304, the pole face of which cooperates with a normally rotating armature 306. The latter is internally threaded and cooperates with an externally threaded bushing 308. The bushing 308 is operatively connected to the clutch plate 288 by means of three pusher rods 310 (Fig. 11A) lying in the keyways previously referred to. The bushing 308 is itself splined to fit into the keyways and therefore turns with the sleeve 282. Armature 306 is provided with a plurality, in this case three detent springs 312 cooperating with radial detent notches 314 (Fig. 12) formed at the end of the sleeve 282.

In operation the clutch is normally disengaged at the clutch face 300. Armature 306 is disengaged by springs 312, which move the armature to the right. When the magnet coil 302 is energized the armature 306 is pulled to the left, thereby moving the pushrods 310 to the left, and consequently moving the clutch plate 288 to the left, thereby causing clutch engagement. As the clutch wears, the armature 306 moves further and further toward the left, until finally it reaches the pole face of the magnet housing 304, whereupon the armature is held against rotation. The continued rotation of the threaded bushing 308 causes the armature to move outward or toward the right, thus again freeing it for rotation. Overtravel or overcompensation is prevented by the detent mechanism. When an air space thus has been restored between the armature and the magnet face the armature is again pulled toward the left, thereby restoring engagement of the main clutch at the friction face 300.

Figures 13, 14, 15:
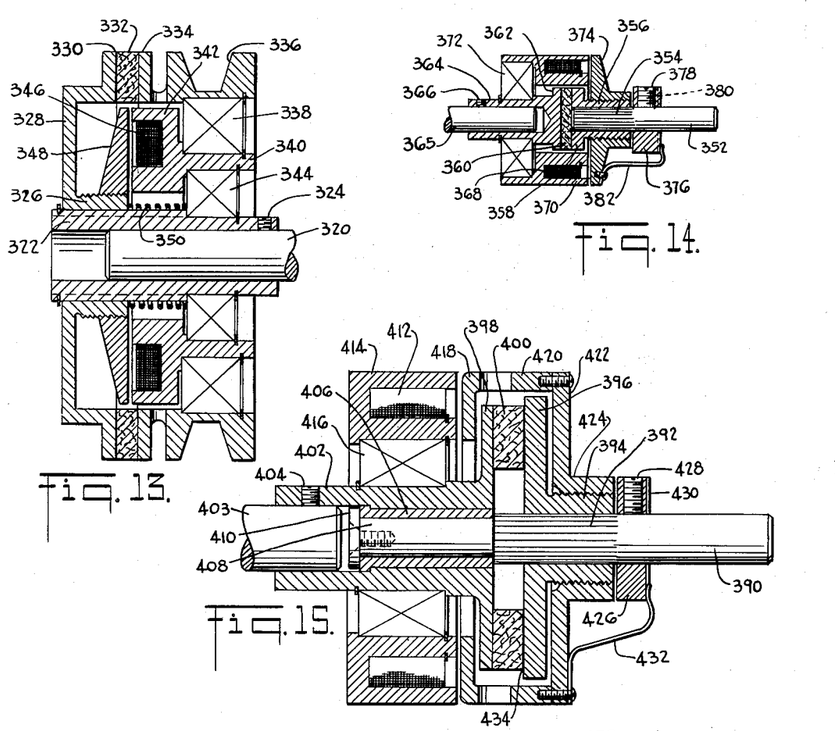
Fig. 13 is a section through a clutch of reduced axial dimension and employing a stationary magnet.
Fig. 14 is a section through a clutch of the "through" type employing a stationary magnet.
Fig. 15 is a section through a modified clutch of the "through" type.

Still another form of clutch embodying a stationary magnet is shown in Fig. 13. In this case the clutch has been reorganized to reduce its axial dimension while increasing its radial dimension. Shaft 320 turns a sleeve 322 through appropriate set screws indicated at 324. The sleeve 322 is splined on its outside to receive therein splines on a threaded hub 326 of a clutch member 328 having a working face at 330. The annular friction shoe 332 is secured to the other main clutch member 334, which, in this case, is provided with a pulley groove 336. The pulley is rotatable on an anti-friction bearing 338 carried on the cylindrical wall 340 of a magnet 342. The wall 340 in turn carries within it an anti-friction bearing 344 which receives the sleeve 322. The magnet coil 346 is received in the ferrous pole piece 342 and remains or may be held stationary. Conductors, not shown, may lead through cylinder 340 to the coil. An armature 348 is threaded to mate with the thread of hub 326, thereby affording adjustment of the clutch. A compression spring 350 normally disengages the clutch.

The operation will be understood from the description of the other forms of the invention, for on energization of the magnet 346 the armature is pulled to the right, thereby engaging the main clutch at the working face 330, thus causing the shaft 320 to turn the pulley 336. When the clutch has worn far enough for the armature 348 to reach the pole face of the magnet 346, it is held against rotation, whereupon the continued rotation of shaft 320 and threaded hub 326 moves the armature toward the left until it is disengaged and freed for resumed rotation, at which time, however, there is a gap which permits engagement of the main clutch.

Fig. 14 illustrates a modification of the invention in which the drive is of the "through" type, that is, the driving and driven shafts may be arranged end to end. Driving shaft 352 is splined at 354 to receive the threaded hub 356 of one main clutch part 358, this having a clutch facing or a disc of friction material 360 secured thereto. The other main clutch part 362 is formed with a hub 364 adapted to receive a driven shaft 365 to which it may be secured by one or more set screws 366. A magnet coil 368 is received in a ferrous housing 370, the latter being supported and stationary on an anti-friction bearing 372 surrounding the hub 364. The armature 374 is threaded to mate with the thread on the hub 356. A collar 376 is secured to shaft 352, as by means of one or more set screws 378, and has radial detent notches formed on one face, as indicated at 380. A plurality, say three or more detent springs 382 cooperate with the detent notches, and also act as return springs for normally releasing the clutch.

Whenever the magnet 368 is energized the armature 374 is pulled toward the left, thereby moving the clutch part 358 toward the left, and so causing engagement of the clutch, with consequent driving of the hub 364 and the shaft 365. When the clutch face wears enough for the armature to reach the stationary pole face of the magnet it is held against rotation, and the continued rotation of the threaded hub 356 causes the armature to move toward the right until it is again free for continued rotation. At this time the desired gap between the armature and the magnet pole face is restored, and this permits renewed binding engagement at the main clutch face.

Fig. 15 illustrates another form of "through" type clutch with a stationary magnet coil. This clutch is quite similar to that described in connection with Fig. 14, but the parts have been rearranged. The driving shaft 390 is splined at 392 to slidably but non-rotatably receive the threaded hub 394 of a main clutch plate 396. The driven part 398 of the clutch carries an annular shoe or clutch facing 400. The driven part 398 is formed integrally with a sleeve 402 adapted to receive a driven shaft 403, the latter being secured thereto by any suitable means such as one or more set screws indicated at 404. The shaft 390 may be carried into the sleeve 402, as indicated at 408, in order to better hold the shafts in alignment, and a suitable bearing 406 is disposed between the reduced portion 408 of the shaft and the sleeve 402. An end collar 410 is secured in position to hold the parts against axial movement.

The magnet 412 is housed in a ferrous housing or pole piece 414, the latter being stationary and supported on an anti-friction bearing 416 disposed around sleeve 402. The armature is indicated at 418, and includes a cylindrical portion 420 secured to a disc 422 having an internally threaded hub 424. This mates with the threaded hub 394 of the clutch plate 396. A collar 426 is secured to shaft 390 by one or more set screws 428, and the outer face of the collar is preferably provided with a series of radial indentations or detent notches 430. A plurality, preferably three detent springs 432 are secured to the collar 422, and their free ends engage the outside of disc 426. The springs thus act to free the clutch faces when the clutch is not in use, as well as to prevent overcompensation.

The operation will be evident from the description of other forms of the invention, the clutch being engaged at the friction face 434 whenever the stationary magnet 412 is energized. As the friction shoe 400 wears, the armature 418 moves closer to the magnet pole face, and when the armature reaches the pole face before the clutch engages, the armature is held against rotation, and the continued rotation of shaft 390 causes the clutch-adjusting thread to move the hub 424 and with it the armature 418 toward the right, thus again freeing the armature for rotation. At this time, however, there is a renewed air gap which affords further movement toward the left of the clutch plate 396, thereby compensating for clutch wear.

Figures 16, 17:
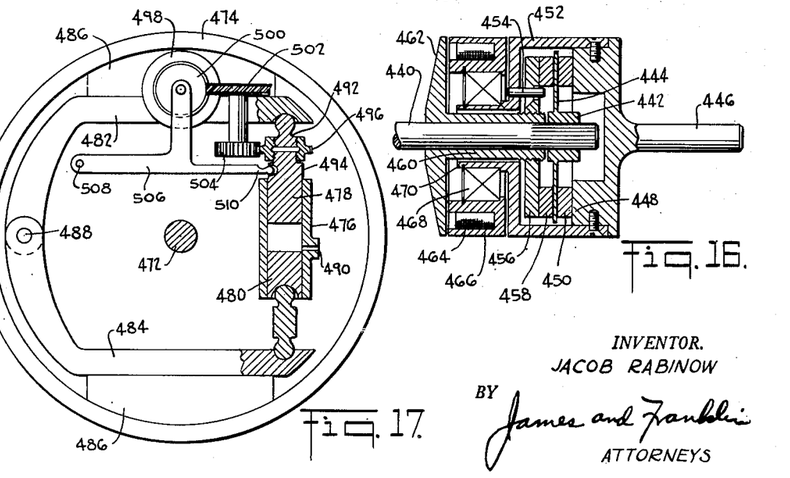
Fig. 16 is a section through a clutch having a driven part of minimum inertia.
Fig. 17 is a partially sectioned elevation showing the application of the invention to a vehicle wheel brake.

Fig. 16 shows still another form of the invention, in which the driven end of the clutch has a minimum of inertia, a feature which is important in some clutch applications. With this in view, the driven end of the clutch comprises only the driven shaft 440, a hub 442 splined thereto, and a thin, lightweight disc 444 secured to the hub 442. The disc and hub are shown integral in the drawing for simplicity, but may be fixedly attached.

Power is supplied to the input shaft 446, which is formed integrally with or may be secured to a clutch part 448 carrying a friction shoe 450. The driving part of the clutch includes also a housing 452 secured to the part 448 and carrying a plurality, preferably three driving pins 454. These slidably carry and turn a clutch plate 456 having secured thereto a friction shoe 458. The plate 456 is threadedly mounted on the threaded hub or sleeve 460 of an armature 462. The latter cooperates with a stationary magnet coil 464 housed in a stationary ferrous pole piece or shell 466. An anti-friction bearing 468 is interposed between the shell and the hub 470 of the housing 452.

In operation whenever the magnet 464 is energized the armature 462 is pulled to the right, thereby moving the clutch plate 456 to the right and so compressing the driven disc 444 between the friction shoes 450 and 458 on opposite sides of the disc. The disc and its hub 442 rotate the driven shaft 440. As the clutch surfaces wear the armature 462 gradually moves toward the right until finally it reaches the pole face of the magnet before the clutch takes hold, at which time the armature is held from rotation while the clutch plate 456 continues to rotate and so is moved toward the right, thereby compensating for the clutch wear.

In general, whenever a stationary magnet is used the armature should be made a part of the driving end of the clutch. The auxiliary clutch acts as a brake. The use of an electromagnet which is stationary eliminates the need for slip rings. The stationary supply conductors have been omitted in the drawing for simplicity.

The description has so far emphasized the application of the invention to clutches, but for the present purpose it should be understood that there is no significant difference between a clutch and a brake. A brake may be considered to be a clutch, the output end of which is held against rotation. Thus in any of the preceding figures of the drawing the input shaft may be subjected to a braking action by permanently locking the output shaft against rotation, or by locking the output part of the clutch against rotation without using any shaft at all. If the clutch is an electro-magnetic clutch the coil end should be held stationary, thus eliminating slip rings.

In Fig. 17 I show one particular form of my invention in which the self-adjustment feature is applied to an internally expanding brake of the kind commonly employed in vehicles, such as automobiles. The driving axle is schematically indicated at 472 and runs out to a wheel carrying a brake drum, the rim of which is shown at 474. The brake is assumed to be hydraulically operated, it comprising a cylinder 476 carrying oppositely movable plungers 478 and 480. These bear against brake arms 482 and 484 carrying brake shoes 486. The brake arms are pivoted and held against rotation at 488. It will be evident that when hydraulic pressure is applied to cylinder 476 through a suitable opening indicated at 490, the upward movement of piston 478 and the downward movement of piston 480 cause a spreading or expansion of the brake shoes, and consequent braking action on the inside wall of the cylindrical drum 474.

To take up wear of the brake shoes 486 the connection between the piston 478 and the arm 482 is lengthened. For this purpose the connection consists of an upper portion 492 and a lower portion 494 connected by an internally threaded gear 496. The upper and lower portions of the thread are oppositely directed, that is, they are right and lefthand threads, so that rotation of gear 496 lengthens or shortens the connection. To rotate the gear 496 I provide a wheel 498 turning a worm or helical gear 500 meshing with a gear 502 which turns a gear 504 meshing with the internally threaded gear 496 previously referred to. The wheel 498 is an auxiliary clutch wheel which may be engaged or disengaged with the inside surface of the drum 474. For this purpose the wheel 498 is carried on an arm 506 pivoted at 508 and having its free end 510 connected to the plunger 478. The wheel 498 is normally disengaged from the drum 474, as shown in the drawing. It will be evident, however, that as the brake shoes wear and the travel of the hydraulic piston 478 increases, the wheel 498 comes closer to engagement with the drum, until finally it engages the drum before the brake shoes take hold, at which time it becomes an adjustment-operating means which is rotated in proper direction to increase the separation of the parts 492 and 494, thus raising the brake arm 482 and its shoe 486 to compensate for wear of the brake shoes. In the meantime this, of course, increases the spacing between the auxiliary wheel 498 and the drum 474, thus disengaging the auxiliary drive for the brake adjustment means.

It will be understood that the showing in Fig. 17 is largely schematic, the stationary bearings for the gears 502, 504 being omitted, as well as the stationary plate on which the fixed pivots 488 and 508 of the brake system are anchored, etc.

In comparison with Fig. 9 it will be seen that the shoes 486 provide a main clutch action on drum 474, which is analogous to the engagement of the multiple plates in Fig. 9; that the auxiliary wheel 498 is analogous to the auxiliary clutch disc 24 in Fig. 9; that in both cases they come closer to engagement as the main friction surfaces wear, until finally they come into driving engagement and operate to drive a screw which compensates for the wear of the friction surfaces, and which at the same time causes disengagement of the auxiliary clutch or operating means.

In the foregoing description of the action of the various modifications I have for clarity taken the liberty of somewhat oversimplifying the actual mechanism of the self-adjustment. The auxiliary clutching action normally does not occur in steps as was at times implied. The auxiliary clutch faces may in some designs rub continually, but if the pitch of the adjusting thread is made fine, or if a gear reduction is employed, or if the thread is of the ball bearing, frictionless type, then the friction torque between the auxiliary faces is very light and causes no appreciable wear as compared to the main friction surfaces. In those designs where the magnet revolves, this frictional torque is a useful component of the total clutch torque, whereas in those cases where the clutch magnet is stationary this torque represents a waste of energy. It can be kept to a negligible amount by proper design, and therefore often may be preferred to the use of slip rings.

It is believed that the construction and operation of my improved self-adjusting clutch or brake, as well as the advantages thereof, will be apparent from the foregoing detailed description. It will also be apparent that while I have shown and described the invention in a number of forms, many changes may be made in the structures disclosed without departing from the scope of the invention as sought to be defined in the following claims. In the claims the term "clutch" is used for convenience, but is not intended to exclude clutches in which one side is held stationary, resulting in a braking action.

I claim:

1. A self-adjusting clutch assembly comprising a main driving part, a main driven part, said main parts having friction surfaces, a control means to cause a relative movement in axial direction between said main parts in order to engage or disengage said friction surfaces, an adjustment means for adjusting the disengaged spacing between said friction surfaces in order to compensate for wear, an adjustment operating clutch auxiliary for operating said adjustment means, one part of said auxiliary being movable with one main part of the main clutch toward and away from the other part of said auxiliary, the parts of said auxiliary being normally spaced from one another but being moved closer together as the main friction surfaces wear, until the auxiliary parts engage before the main friction surfaces engage and thereby cause the auxiliary to operate the adjustment means, and a plurality of additional mutually cooperating means connected to said adjustment means to prevent over-adjustment or over-compensation for wear, said additional mutually cooperating means being relatively movable in either direction for substantially the full range of adjustment.

2. A self-adjusting clutch assembly comprising a main driving part, a main driven part, said main parts having friction surfaces, a control means to cause a relative movement in axial direction between said main parts in order to engage or disengage said friction surfaces, an adjustment means for adjusting the disengaged spacing between said friction surfaces in order to compensate for wear, an adjustment operating clutch auxiliary for operating said adjustment means, one part of said auxiliary being movable with one main part of the main clutch toward and away from the other part of said auxiliary, the parts of said auxiliary being normally spaced from one another but being moved closer together as the main friction surfaces wear, until the auxiliary parts engage before the main friction surfaces engage and thereby cause the auxiliary to operate the adjustment means, and a plurality of additional mutually cooperating means connected to said adjustment means to prevent over-adjustment or over-compensation for wear, said means consisting of a ring of detent notches, and a detent cooperating therewith to discourage excessive rotation of the adjustment operating auxiliary, said detent notches and detent being relatively movable in either direction for substantially the full range of adjustment.

3. A self-adjusting clutch assembly comprising a main driving part, a main driven part, said main parts having friction surfaces, a control means to cause a relative movement in axial direction between said main parts in order to engage or disengage said friction surfaces, an adjustment means for adjusting the disengaged spacing between said friction surfaces in order to compensate for wear, an adjustment operating clutch auxiliary for operating said adjustment means, one part of said auxiliary being movable with one main part of the main clutch toward and away from the other part of said auxiliary, the parts of said auxiliary being normally spaced from one another but being moved closer together as the main friction surfaces wear, until the auxiliary parts engage before the main friction surfaces engage and thereby cause the auxiliary to operate the adjustment means, and a plurality of additional mutually cooperating means to prevent over-adjustment or over-compensation for wear, said means comprising a train of reduction gearing between the auxiliary and the adjustment means.

4. A self-adjusting clutch assembly comprising a main driving part, a main driven part, said main parts having friction surfaces, a control means to cause a relative movement in axial direction between said main parts in order to engage or disengage said friction surfaces, an adjustment means for adjusting the disengaged spacing between said friction surfaces in order to compensate for wear, an adjustment operating clutch auxiliary for operating said adjustment means, one part of said auxiliary being movable with one main part of the main clutch toward and away from the other part of said auxiliary, the parts of said auxiliary being normally spaced from one another but being moved closer together as the main friction surfaces wear, until the auxiliary parts engage before the main friction surfaces engage and thereby cause the auxiliary to operate the adjustment means, and a plurality of additional mutually cooperating means to prevent over-adjustment or over-compensation for wear, said means being inertia means comprising a plurality of rotatable parts and a step-up gear driven by said auxiliary for rotating said parts at relatively high speed when the auxiliary operates the adjustment means.

5. A self-adjusting clutch assembly comprising a main driving part, a main driven part, said main parts having friction surfaces, a control means to cause a relative movement in axial direction between said main parts in order to engage or disengage said friction surfaces, an adjustment means for adjusting the disengaged spacing between said friction surfaces in order to compensate for wear, an adjustment operating clutch auxiliary for operating said adjustment means, one part of said auxiliary being movable with one main part of the main clutch toward and away from the other part of said auxiliary, the parts of said auxiliary being normally spaced from one another but being moved closer together as the main friction surfaces wear, until the auxiliary parts engage before the main friction surfaces engage and thereby cause the auxiliary to operate the adjustment means, the aforesaid control consisting of an annular magnet and an annular armature arranged concentrically with the main clutch parts, said magnet moving said armature axially to control the main clutch, and said auxiliary consisting of the same magnet and the same armature functioning to adjust the clutch when the armature actually reaches and is rotationally locked to the magnet, and a plurality of additional mutually cooperating means connected to said adjustment means to prevent over-adjustment or over-compensation for wear, said additional mutually cooperating means being relatively movable in either direction for substantially the full range of adjustment.

6. A self-adjusting clutch assembly comprising a main driving part, a main driven part, said main parts having friction surfaces, a control means to cause a relative movement in axial direction between said main parts in order to engage or disengage said friction surfaces, an adjustment means for adjusting the disengaged spacing between said friction surfaces in order to compensate for wear, an adjustment operating clutch auxiliary for operating said adjustment means, one part of said auxiliary being movable with one main part of the main clutch toward and away from the other part of said auxiliary, the parts of said auxiliary being normally spaced from one another but being moved closer together as the main friction surfaces wear, until the auxiliary parts engage before the main friction surfaces engage and thereby cause the auxiliary to operate the adjustment means, the aforesaid control consisting of an annular magnet and an annuluar armature arranged concentrically with the main clutch parts, said magnet moving said armature axially to control the main clutch, and said auxiliary consisting of the same magnet and the same armature functioning to adjust the clutch when the armature actually reaches and is rotationally locked to the magnet, and a plurality of additional mutually cooperating means connected to said adjustment means to prevent over-adjustment or over-compensation for wear, said means consisting of a ring of detent notches and a detent cooperating therewith to discourage excessive rotation, said detent notches and detent being relatively movable in either direction for substantially the full range of adjustment.

7. A self-adjusting clutch assembly comprising a main driving part, a main driven part, said main parts having friction surfaces, a control means to cause a relative movement in axial direction between said main parts in order to engage or disengage said friction surfaces, an adjustment means for adjusting the disengaged spacing between said friction surfaces in order to compensate for wear, an adjustment operating clutch auxiliary for operating said adjustment means, one part of said auxiliary being movable with one main part of the main clutch toward and away from the other part of said auxiliary, the parts of said auxiliary being normally spaced from one another but being moved closer together as the main friction surfaces wear, until the auxiliary parts engage before the main friction surfaces engage and thereby cause the auxiliary to operate the adjustment means, the aforesaid control consisting of an annular magnet and an annular armature arranged concentrically with the main clutch parts, said magnet moving said armature axially to control the main clutch, and said auxiliary consisting of the same magnet and the same armature functioning to adjust the clutch when the armature actually reaches and is rotationally locked to the magnet, and a plurality of additional mutually cooperating means to prevent over-adjustment or over-compensation for wear, said means comprising a train of reduction gearing between the auxiliary and the adjustment means.

8. A self-adjusting clutch assembly comprising a main driving part, a main driven part, said main parts having friction surfaces, a control means to cause a relative movement in axial direction between asid main parts in order to engage or disengage said friction surfaces, an adjustment means for adjusting the disengaged spacing between said friction surfaces in order to compensate for wear, an adjustment operating clutch auxiliary for operating said adjustment means, one part of said auxiliary being movable with one main part of the main clutch toward and away from the other part of said auxiliary, the parts of said auxiliary being normally spaced from one another but being moved closer together as the main friction surfaces wear, until the auxiliary parts engage before the main friction surfaces engage and thereby cause the auxiliary to operate the adjustment means, the aforesaid control consisting of an annular magnet and an annular armature arranged concentrically with the main clutch parts, said magnet moving said armature axially to control the main clutch, and said auxiliary consisting of the same magnet and the same armature functioning to adjust the clutch when the armature actually reaches and is rotationally locked to the magnet, and a plurality of additional mutually cooperating means to prevent over-adjustment or over-compensation for wear, said means being inertia means comprising a plurality of rotatable parts and a step-up gear driven by said auxiliary for rotating said parts at relatively high speed when the auxiliary operates the adjustment means.

9. A self-adjusting clutch assembly comprising a main driving part, a main driven part, said main parts having friction surfaces, a control means to cause a relative movement between said main parts to engage or disengage said friction surfaces, an adjustment means for adjusting the disengaged spacing between said friction surfaces in order to compensate for wear, said adjustment means including a thread on one main part and a mating thread on the control means, an adjustment operating clutch auxiliary for operating said threaded adjustment means, one part of said auxiliary being movable with one main part of the main clutch toward and away from the other part of said auxiliary, the parts of said auxiliary being normally spaced from one another but being moved closer together as the main friction surfaces wear, until the auxiliary parts engage before the main friction surfaces engage and thereby cause the auxiliary to so operate the threaded adjustment means as to bring the main friction surfaces toward one another in order to compensate for their wear, and a plurality of additional mutually cooperating means connected to said adjustment means to prevent over-adjustment or over-compensation for wear, said additional mutually cooperating means being relatively movable in either direction for substantially the full range of adjustment.

10. A self-adjusting clutch assembly comprising a main driving part, a main driven part, said main parts having friction surfaces, a control means to cause a relative movement between said main parts to engage or disengage said friction surfaces, an adjustment means for adjusting the disengaged spacing between said friction surfaces in order to compensate for wear, said adjustment means including a thread on one main part and a mating thread in the control means, an adjustment operating clutch auxiliary for operating said threaded adjustment means, one part of said auxiliary being movable with one main part of the main clutch toward and away from the other part of said auxiliary, the parts of said auxiliary being normally spaced from one another but being moved closer together as the main friction surfaces wear, until the auxiliary parts engage before the main friction surfaces engage and thereby cause the auxiliary to so operate the threaded adjustment means as to bring the main friction surfaces toward one another in order to compensate for their wear, and a plurality of additional mutually cooperating means connected to said adjustment means to prevent over-adjustment or over-compensation for wear, said means consisting of a ring of detent notches and a detent cooperating therewith, said detent notches being provided on one of said threaded parts, and said detent being provided on the mating threaded part, said detent notches and detent being relatively movable in either direction for substantially the full range of adjustment.

11. A self-adjusting clutch assembly comprising a main driving part, a main driven part, said main parts having friction surfaces, a control means to cause a relative movement between said main parts to engage or disengage said friction surfaces, an adjustment means for adjusting the disengaged spacing between said friction surfaces in order to compensate for wear, said adjustment means including a thread on one main part and a mating thread in the control means, an adjustment operating clutch auxiliary for operating said threaded adjustment means, one part of said auxiliary being movable with one main part of the main clutch toward and away from the other part of said auxiliary, the parts of said auxiliary being normally spaced from one another but being moved closer together as the main friction surfaces wear, until the auxiliary parts engage before the main friction surfaces engage and thereby cause the auxiliary to so operate the threaded adjustment means as to bring the main friction surfaces toward one another in order to compensate for their wear, and a plurality of additional mutually cooperating means to prevent over-adjustment or over-compensation for wear, said means comprising a train of reduction gearing between the auxiliary which operates the threaded adjustment means and the threaded adjustment means.

12. A self-adjusting clutch assembly comprising a main driving part, a main driven part, said main parts having friction surfaces, a control means to cause a relative movement between said main parts to engage or disengage said friction surfaces, an adjustment means for adjusting the disengaged spacing between said friction surfaces in order to compensate for wear, said adjustment means including a thread on one main part and a mating thread in the control means, an adjustment operating clutch auxiliary for operating said threaded adjustment means, one part of said auxiliary being movable with one main part of the main clutch toward and away from the other part of said auxiliary, the parts of said auxiliary being normally spaced from one another but being moved closer together as the main friction surfaces wear, until the auxiliary parts engage before the main friction surfaces engage and thereby cause the auxiliary to so operate the threaded adjustment means as to bring the main friction surfaces toward one another in order to compensate for their wear, and a plurality of additional mutually cooperating means to prevent over-adjustment or over-compensation for wear, said means being inertia means comprising a plurality of rotatable parts and a step-up gear driven by said auxiliary for rotating said parts at relatively high speed when the auxiliary operates the adjustment means.

13. A self-adjusting clutch assembly comprising a main driving part, a main driven part, said main parts having friction surfaces, a control means to cause a relative movement between said main parts to engage or disengage said friction surfaces, an adjustment means for adjusting the disengaged spacing between said friction surfaces in order to compensate for wear, said adjustment means including a thread on one main part and a mating thread in the control means, an adjustment operating clutch auxiliary for operating said threaded adjustment means, one part of said auxiliary being movable with one main part of the main clutch toward and away from the other part of said auxiliary, the parts of said auxiliary being normally spaced from one another but being moved closer together as the main friction surfaces wear, until the auxiliary parts engage before the main friction surfaces engage and thereby cause the auxiliary to so operate the threaded adjustment means as to bring the main friction surfaces toward one another in order to compensate for their wear, the said control means consisting of an annular magnet and an annular armature arranged concentrically with the main clutch parts, said magnet moving said armature axially to control the main clutch, and said auxiliary consisting of the same magnet and the same armature functioning to adjust the clutch when the armature actually reaches and is rotationally locked to the magnet, and a plurality of additional mutually cooperating means connected to said adjustment means to prevent over-adjustment or over-compensation for wear, said additional mutually cooperating means being relatively movable in either direction for substantially the full range of adjustment.

14. A self-adjusting clutch assembly comprising a main driving part, a main driven part, said main parts having friction surfaces, a control means to cause a relative movement between said main parts to engage or disengage said friction surface, an adjustment means for adjusting the disengaged spacing between said friction surfaces in order to compensate for wear, said adjustment means including a thread on one main part and a mating thread in the control means, an adjustment operating clutch auxiliary for operating said threaded adjustment means, one part of said auxiliary being movable with one main part of the main clutch toward and away from the other part of said auxiliary, the parts of said auxiliary being normally spaced from one another but being moved closer together as the main friction surfaces wear, until the auxiliary parts engage before the main friction surfaces engage and thereby cause the auxiliary to so operate the threaded adjustment means as to bring the main friction surfaces toward one another in order to compensate for their wear, the said control means consisting of an annular magnet and an annular armature arranged concentrically with the main clutch parts, said magnet moving said armature axially to control the main clutch, and said auxiliary consisting of the same magnet and the same armature functioning to adjust the clutch when the armature actually reaches and is rotationally locked to the magnet, and a plurality of additional mutually cooperating means connected to said adjustment means to prevent over-adjustment or over-compensation for wear, said means consisting of detent notches and a detent cooperating therewith, said detent notches being provided on one of said threaded parts, and said detent being provided on the mating threaded part, said detent notches and detent being relatively movable in either direction for substantially the full range of adjustment.

15. A self-adjusting clutch assembly comprising a main driving part, a main driven part, said main parts having friction surfaces, a control means to cause a relative movement between said main parts to engage or disengage said friction surfaces, an adjustment means for adjusting the disengaged spacing between said friction surfaces in order to compensate for wear, said adjustment means including a thread on one main part and a mating thread in the control means, an adjustment operating clutch auxiliary for operating said threaded adjustment means, one part of said auxiliary being movable with one main part of the main clutch toward and away from the other part of said auxiliary, the parts of said auxiliary being normally spaced from one another but being moved closer together as the main friction surfaces wear, until the auxiliary parts engage before the main friction surfaces engage and thereby cause the auxiliary to so operate the threaded adjustment means as to bring the main friction surfaces toward one another in order to compensate for their wear, the said control means consisting of an annular magnet and annular armature arranged concentrically with the main clutch parts, said magnet moving said armature axially to control the main clutch, and said auxiliary consisting of the same magnet and the same armature functioning to adjust the clutch when the armature actually reaches and is rotationally locked to the magnet, and a plurality of additional mutually cooperating means to prevent over-adjustment or over-compensation for wear, said means comprising a train of reduction gearing between the auxiliary which operates the threaded adjustment means and the threaded adjustment means.

16. A self-adjusting clutch assembly comprising a main driving part, a main driven part, said main parts having friction surfaces, a control means to cause a relative movement between said main parts to engage or disengage said friction surfaces, an adjustment means for adjusting the disengaged spacing between said friction surfaces in order to compensate for wear, said adjustment means including a thread on one main part and a mating thread in the control means, an adjustment operating clutch auxiliary for operating said threaded adjustment means, one part of said auxiliary being movable with one main part of the main clutch toward and away from the other part of said auxiliary, the parts of said auxiliary being normally spaced from one another but being moved closer together as the main friction surfaces wear, until the auxiliary parts engage before the main friction surfaces engage and thereby cause the auxiliary to so operate the threaded adjustment means as to bring the main friction surfaces toward one another in order to compensate for their wear, the said control means consisting of an annular magnet and an annular armature arranged concentrically with the main clutch parts, said magnet moving said armature axially to control the main clutch, and said auxiliary consisting of the same magnet and the same armature functioning to adjust the clutch when the armature actually reaches and is rotationally locked to the magnet, and a plurality of additional mutually cooperating means to prevent over-adjustment or over-compensation for wear, said means being inertia means comprising a plurality of rotatable parts and a step-up gear driven by said auxiliary for rotating said parts at relatively high speed when the auxiliary operates the adjustment means.

References Cited in the file of this patent

UNITED STATES PATENTS

| Number | Name | Date |
|---|---|---|
| 1,049,957 | Whitcomb | Jan. 7, 1913 |
| 1,056,242 | Whitcomb | Mar. 18, 1913 |
| 1,056,243 | Whitcomb | Mar. 18, 1913 |
| 2,087,383 | Lafitte | July 20, 1937 |
| 2,366,594 | Carlson | Jan. 2, 1945 |

FOREIGN PATENTS

| Number | Country | Date |
|---|---|---|
| 388,291 | Great Britain | Feb. 23, 1933 |
| 599,540 | Great Britain | Mar. 15, 1948 |
| 617,406 | Great Britain | Feb. 4, 1949 |